(12) United States Patent
Gill

(10) Patent No.: US 6,400,536 B1
(45) Date of Patent: Jun. 4, 2002

(54) LOW UNIAXIAL ANISOTROPY COBALT IRON (COFE) FREE LAYER STRUCTURE FOR GMR AND TUNNEL JUNCTION HEADS

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,238

(22) Filed: Mar. 30, 1999

(51) Int. Cl.[7] .................................................. G11B 5/39
(52) U.S. Cl. .................................................. 360/324.12
(58) Field of Search ........................... 360/324.12, 317, 360/318, 324.11; 338/32 R; 324/252, 207.21

(56) References Cited

U.S. PATENT DOCUMENTS

| | | | | |
|---|---|---|---|---|
| 5,408,377 A | * | 4/1995 | Gurney et al. | 360/113 |
| 5,650,958 A | * | 7/1997 | Gallagher et al. | 365/173 |
| 5,742,162 A | * | 4/1998 | Nepela et al. | 324/252 |
| 5,852,531 A | * | 12/1998 | Yamada | 360/113 |
| 5,896,252 A | * | 4/1999 | Kanai | 360/113 |
| 5,991,125 A | * | 11/1999 | Iwasaki et al. | 360/113 |
| 6,038,107 A | * | 3/2000 | Pinarbasi | 360/113 |
| 6,088,195 A | * | 7/2000 | Kamiguchi et al. | 360/113 |
| 6,108,177 A | * | 8/2000 | Gill | 360/324.12 |
| 6,133,732 A | * | 10/2000 | Hayashi | 324/252 |
| 6,154,349 A | * | 11/2000 | Kanai et al. | 360/324.12 |
| 6,166,948 A | * | 12/2000 | Parkin et al. | 365/173 |
| 6,191,926 B1 | * | 2/2001 | Everitt et al. | 360/324.11 |
| 6,201,673 B1 | * | 3/2001 | Rottmayer et al. | 360/324.12 |

* cited by examiner

*Primary Examiner*—Brian E. Miller
(74) *Attorney, Agent, or Firm*—Ervin F. Johnston; Gray Cary Ware & Freidenrich

(57) ABSTRACT

A multilayered free layer structure is provided for a spin valve sensor or a tunnel junction sensor wherein the net uniaxial anisotropy ($H_K$) of the free layer structure is low, even though some of the layers of the free layer structure have a high uniaxial anisotropy. In a preferred embodiment this is accomplished by orienting the easy axes of the high uniaxial anisotropy layers perpendicular with respect to one another so that their uniaxial anisotropies counterbalance one another leaving a low net uniaxial anisotropy which may be simply the uniaxial anisotropy of a low uniaxial anisotropy layer in the free layer structure.

44 Claims, 12 Drawing Sheets

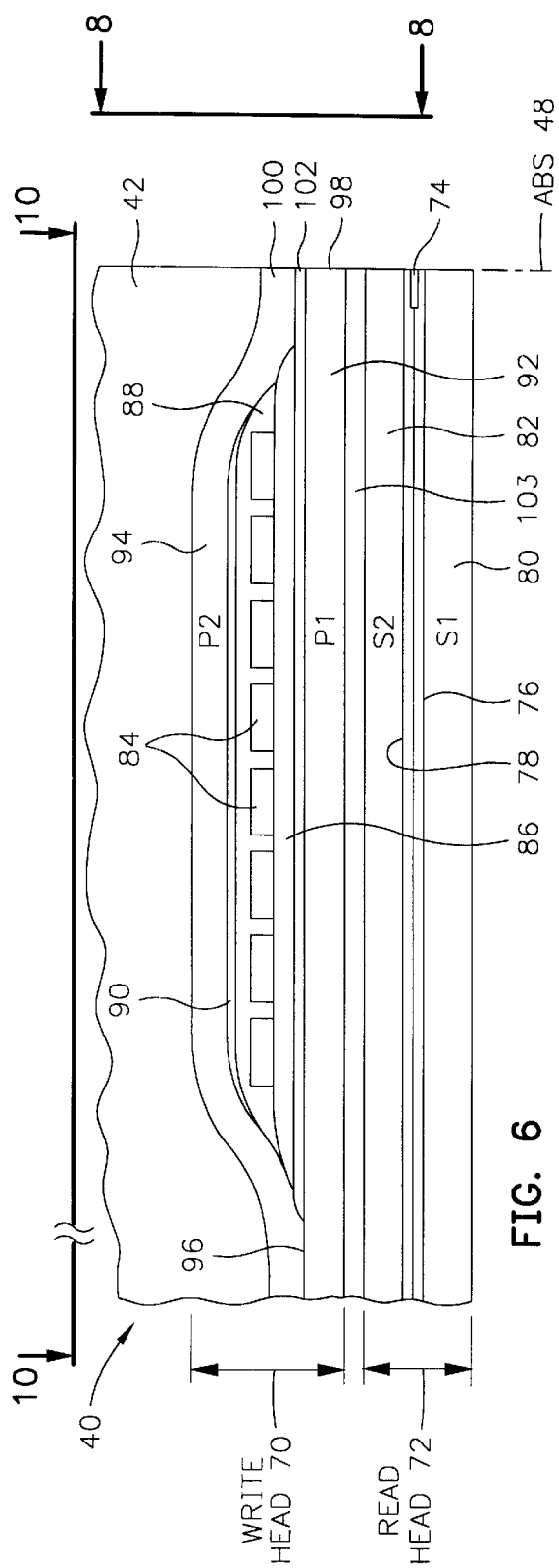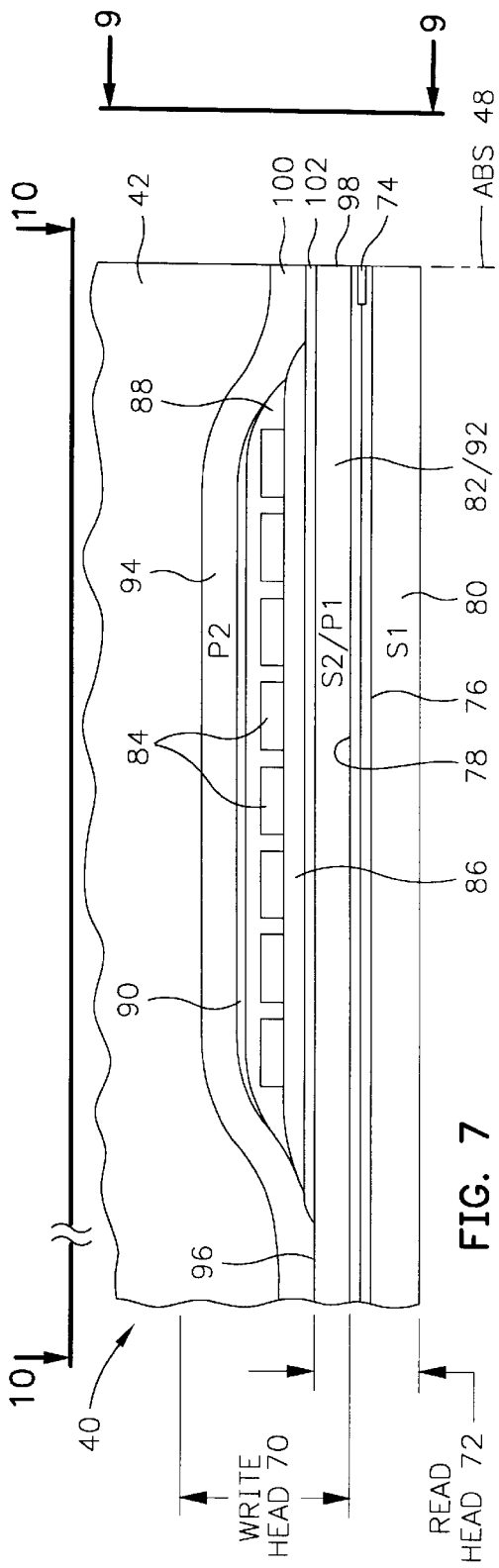
FIG. 6
FIG. 7

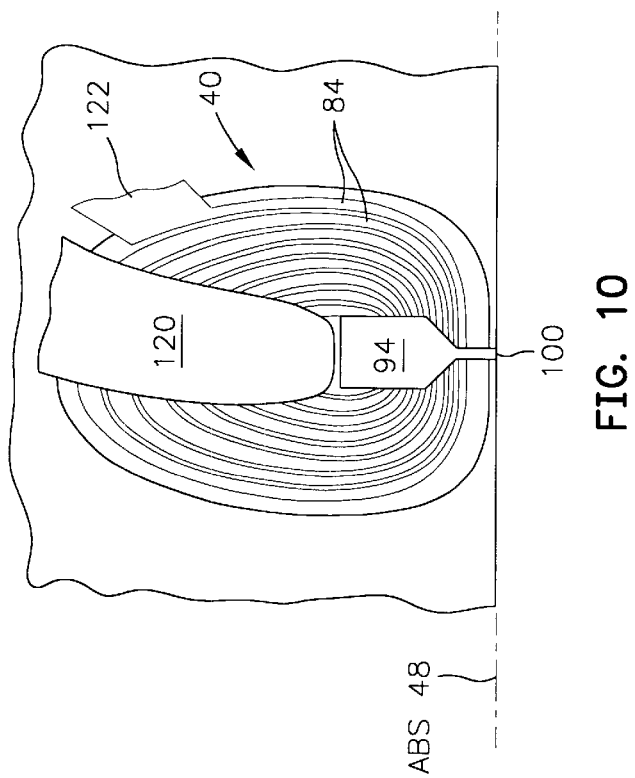
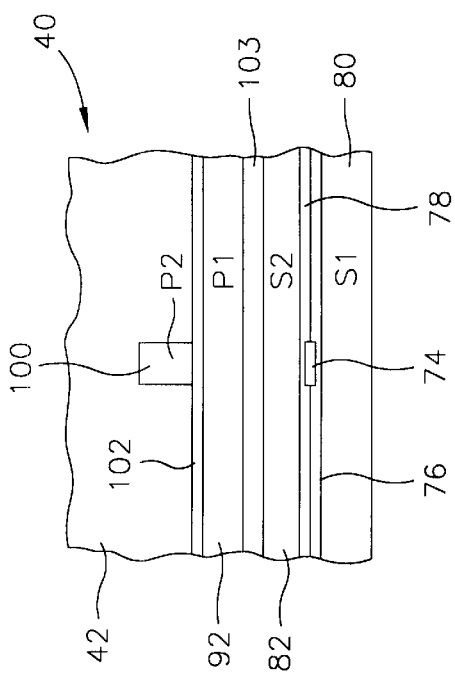
FIG. 10
FIG. 8
FIG. 9

(ABS)

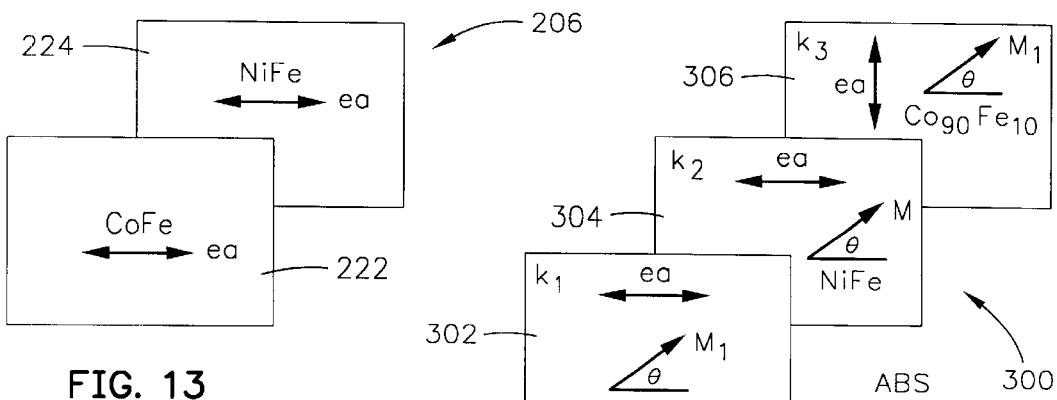
FIG. 13
FIG. 14
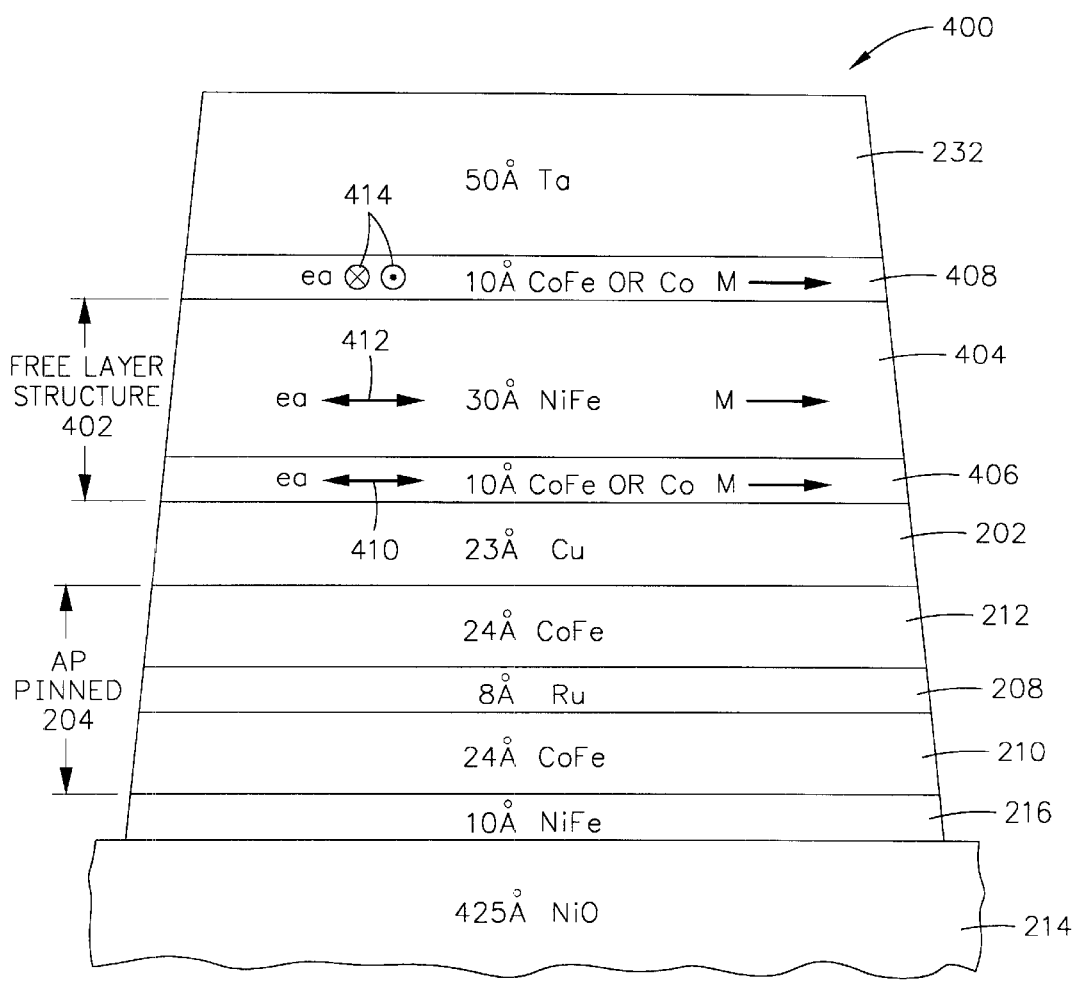
FIG. 15

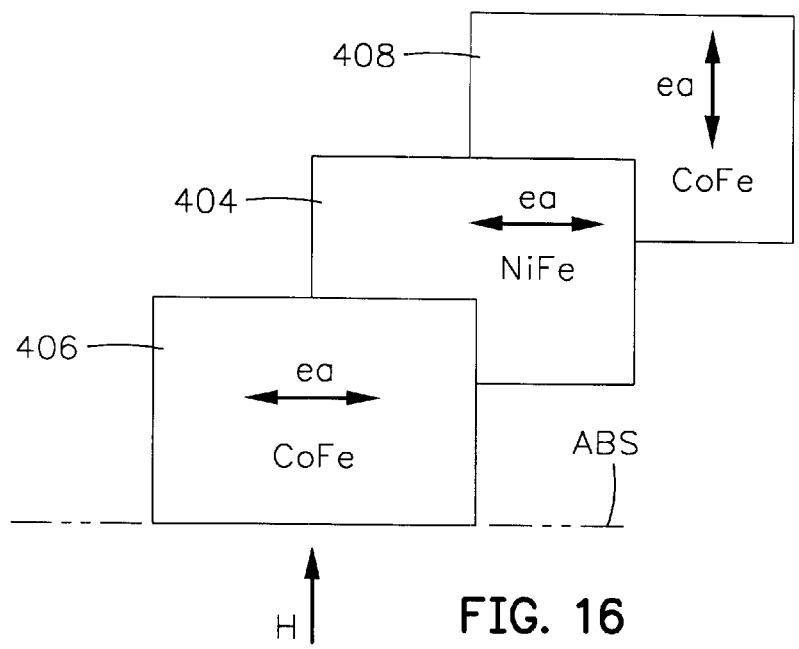
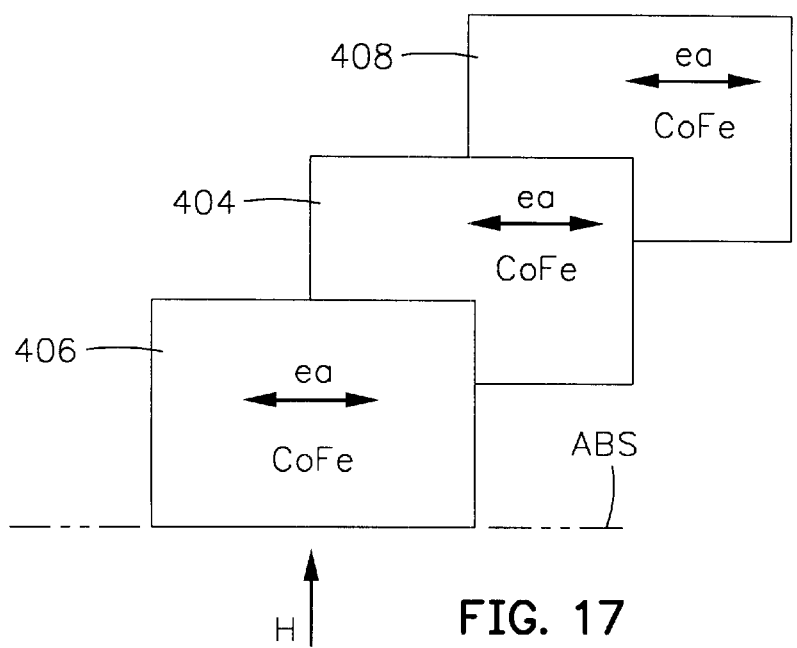

LOW UNIAXIAL ANISOTROPY COBALT IRON (COFE) FREE LAYER STRUCTURE FOR GMR AND TUNNEL JUNCTION HEADS

BACKGROUND OF THE INVENTION

1. Field of the Invention

The present invention relates to a low uniaxial anisotropy cobalt iron (CoFe) free layer structure for giant magnetoresistive (GMR) and tunnel junction heads and, more particularly, to a multilayered free layer structure wherein the uniaxial anisotropies ($H_K$) of the layers counterbalance one another to provide a low net uniaxial anisotropy.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes cause potential changes that are detected and processed as playback signals by the processing circuitry.

The spin valve sensor is characterized by a magnetoresistive (MR) coefficient that is substantially higher than the MR coefficient of an anisotropic magnetoresistive (AMR) sensor. MR coefficient is dr/R were dr is the change in resistance of the spin valve sensor and R is the resistance of the spin valve sensor before the change. A spin valve sensor is typically referred to as a giant magnetoresistive (GMR) sensor. When a spin valve sensor employs a single pinned layer it is referred to as a simple spin valve.

Another type of spin valve sensor is an antiparallel (AP) spin valve sensor. The AP pinned spin valve sensor differs from the simple spin valve sensor in that the AP pinned spin valve sensor has an AP pinned structure that has first and second AP pinned layers instead of a single pinned layer. An AP coupling layer is sandwiched between the first and second AP pinned layers. The first AP pinned layer has its magnetic moment oriented in a first direction by exchange coupling to the antiferromagnetic pinning layer. The second AP pinned layer is immediately adjacent to the free layer and is antiparallel exchange coupled to the first AP pinned layer because of the minimal thickness (in the order of 8 Å) of the AP coupling layer between the first and second AP pinned layers. Accordingly, the magnetic moment of the second AP pinned layer is oriented in a second direction that is antiparallel to the direction of the magnetic moment of the first AP pinned layer.

Another type of read sensor is a tunnel junction sensor. The details of tunnel junction are described in a commonly assigned U.S. Pat. No. 5,650,958 to Gallagher et al., which is incorporated by reference herein. A typical tunnel junction sensor has two ferromagnetic layers (i.e., the pinned and free layers) separated by a thin spacer layer which relies upon the phenomenon of spin-polarized electron tunneling. The free and pinned layers, which may be NiFe or CoFe, are crystalline in structure and are separated by an electrically insulating spacer layer that is thin enough that quantum mechanical tunneling occurs between the free and pinned layers. The tunneling phenomenon is electron spin dependent, making the magnetic response of the tunnel junction sensor a function of the relative orientations and spin polarization of the conduction electrons between the free and pinned layers. Ideally, the magnetic moment orientation of the pinned layer should be pinned 90° to the magnetic moment orientation of the free layer, with the magnetic direction of the free layer being able to respond to external magnetic fields. The pinned layer has a magnetic moment that is pinned in its orientation by exchange coupling with a pinning layer that is made of an antiferromagnetic material.

In each of the GMR sensor and the tunnel junction sensor it has been found that a thin layer of cobalt (Co), and preferably cobalt iron (CoFe), between the free layer and the spacer layer increases the magnetoresistive coefficient (dr/R) of the sensor. For purposes to be explained hereinafter the thickness of the cobalt (Co) or cobalt iron (CoFe) layer is very thin, such as 10 Å, and for this reason it is sometimes referred to as a nanolayer. The nanolayer is exchange coupled to the free layer, which is typically nickel iron (NiFe). The nickel iron (NiFe) and the nanolayer are considered collectively as the free layer. Because of their exchange coupling each layer has a magnetic moment that is oriented in the same direction. This direction is parallel to the ABS in a quiescent state, namely when the sensor is not subjected to an applied field (H) from the rotating magnetic disk.

Each of the nanolayer and the nickel iron (NiFe) layer has a uniaxial anisotropy ($H_K$). Uniaxial anisotropy is the amount of applied field (H) that is required to rotate the magnetic moment of the layer from an easy axis position to 90° thereto. In the case of a free layer it would be the amount of applied field (H) from the rotating magnetic disk required to rotate the magnetic moment of the free layer from a position parallel to the ABS to a position perpendicular to the ABS. Nickel iron (NiFe) is a desirable material for a free layer since it has a low uniaxial anisotropy ($H_K$). When the uniaxial anisotropy ($H_K$) is low the magnetic moment is easily rotated by the applied field (H) from the rotating magnetic disk which makes the read sensor highly sensitive. Unfortunately, the cobalt iron (CoFe) or the cobalt (Co) of the nanolayer has a high uniaxial anisotropy ($H_K$) which makes rotation of the magnetic moment stiff in its response to an applied field (H) from the rotating magnetic disk. The high uniaxial anisotropy of the cobalt iron (CoFe) or cobalt (Co) stiffens the response of the combined layers of the nanolayer and the nickel iron (NiFe) layer causing the free layer to be less responsive to applied fields from the rotating magnetic disk. This is why the thickness of the cobalt iron (CoFe) or the cobalt (Co) of the nanolayer is kept as thin as possible. While a thickness of 5 Å would be desirable, this is sometimes too thin and results in nonuniformity of the nanolayer. Accordingly, the thickness is generally 10 Å–15 Å.

Increased uniaxial anisotropy ($H_K$) of the free layer structure also causes another problem. This problem is a decrease in the flux decay in the free layer between flux inception at the ABS and the top edge of the free layer, which distance is known in the art as the stripe height. Since the sensor is located between first and second ferromagnetic shield layers the flux leaks into the shield layers commencing at the ABS and continues to the top edge of the free layer. This leakage constitutes the aforementioned flux decay. The flux decay length along the stripe height is a length where the flux has decayed to 70% of its original amount at the ABS. Flux decay length is equal to $$\text{Flux Decay Length} = \frac{\sqrt{\mu g t}}{2}$$

where $\mu$ is the permeability of the material and t is the thickness of the layer. Permeability ($\mu$) is also related to uniaxial anisotropy ($H_K$) by $$\mu = 4\pi M_S \div H_K$$

where $M_S$ is the saturation magnetization of the material. It can be seen from the above that as the uniaxial anisotropy ($H_K$) increases the permeability ($\mu$) decreases and that when the permeability ($\mu$) decreases the flux decay length decreases.

Because of the advantages of employing cobalt iron (CoFe) or cobalt (Co) as part of the free layer next to the spacer layer there is a strong-felt need for reducing the uniaxial anisotropy ($H_K$) of the free layer structure so as to increase the sensitivity and the flux decay length of the sensor.

SUMMARY OF THE INVENTION

I have discovered a relationship between uniaxial anisotropies ($H_K$) in a multilayered free layer structure which can be employed for providing a net uniaxial anisotropy ($H_K$) which is low so that the magnetic moment of the free layer structure can be easily rotated by an applied field for promoting high read sensitivity of the sensor. This relationship is highly useful when a layer of the free layer structure has a high uniaxial anisotropy ($H_K$). The relationship requires that the easy axes of a plurality of layers be set at an angle or angles with respect to one another. For instance, in a free layer structure wherein a cobalt iron (CoFe) or cobalt (Co) nanolayer is employed between the nickel iron (NiFe) free layer and a spacer layer, a second cobalt iron (CoFe) or cobalt (Co) free layer can be employed on an opposite side of the nickel iron (NiFe) free layer. The easy axes of the nanolayer between the nickel iron (NiFe) free layer and the spacer layer may be oriented parallel to the ABS, the easy axis of the nickel iron (NiFe) free layer may be oriented parallel to the ABS, and the easy axis of the cobalt iron (CoFe) or cobalt (Co) free layer on the opposite side of the nickel iron (NiFe) free layer may have an easy axis that is perpendicular to the ABS. Assuming that the nanolayer and the cobalt iron (CoFe) or cobalt (Co) free layer on the opposite side of the nickel iron (NiFe) free layer are of the same material and have the same thickness their uniaxial anisotropies will cancel leaving simply the low uniaxial anisotropy of the nickel iron (NiFe) free layer therebetween.

Many combinations of multilayered free layer structures may be made according to the present invention for lowering the net uniaxial anisotropy ($H_K$) of the free layer structure. Another example may be simply a bilayer free layer structure wherein the first layer is cobalt iron (CoFe) and the second layer is cobalt iron (CoFe) with the first and second layers having equal thickness, the first layer having an easy axis parallel to the ABS and the second layer having an easy axis perpendicular to the ABS. In this instance the net uniaxial anisotropy ($H_K$) would be zero and the orientation of the magnetic moment of the combined layers in a quiescent state would be responsive to an external field such as hard biasing layers at the side edges of the sensor. It should be understood that in any multilayered free layer structure the magnetic moment of each layer is oriented in the same direction since the layers are exchange coupled.

An object of the present invention is to provide a low uniaxial anisotropy ($H_K$) free layer structure which employs a high uniaxial anisotropy ($H_K$) material such as cobalt iron (CoFe).

Another object is to provide a multilayered free layer structure wherein the uniaxial anisotropies ($H_K$) of the various layers counterbalance one another to provide a low net uniaxial anisotropy ($H_K$).

A farther object is to provide a multilayered free layer structure which has an easy axis oriented parallel to the ABS and a low net uniaxial anisotropy ($H_K$) even though one or more of the layers has a high uniaxial anisotropy ($H_K$).

Other objects and advantages of the present invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIGS. 6 or 7 with all material above the coil layer and leads removed;

FIG. 13 is a schematic exploded isometric illustration of the free layer structure of FIG. 12;

FIG. 14 is a schematic exploded isometric illustration of a multilayered free layer structure for explaining a derivation employed in the present invention;

FIG. 15 is an ABS illustration of a spin valve sensor of the present invention wherein a free layer structure has a low net uniaxial anisotropy ($H_K$) even though layers employed therein have a high uniaxial anisotropy ($H_K$);

FIG. 16 is a schematic exploded isometric illustration of the free layer structure of FIG. 15;

FIG. 17 is a schematic exploded isometric illustration of the free layer structure which is the same as FIG. 16 except the easy axes of the layers are all in the same direction;

DESCRIPTION OF THE PREFERRED EMBODIMENTS

Magnetic Disk Drive

Figure 1:
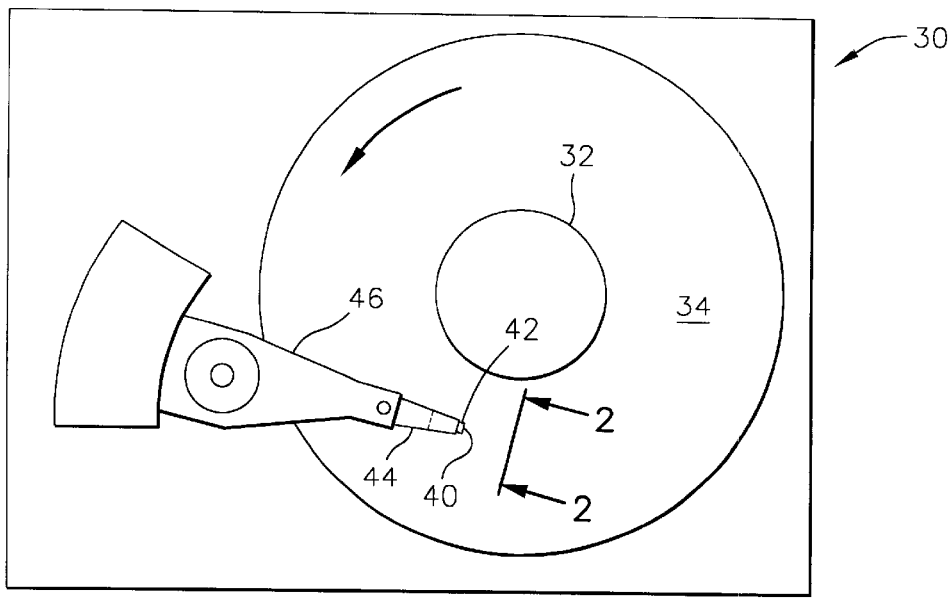
FIG. 1 is a plan view of an exemplary magnetic disk drive.
Figure 2:
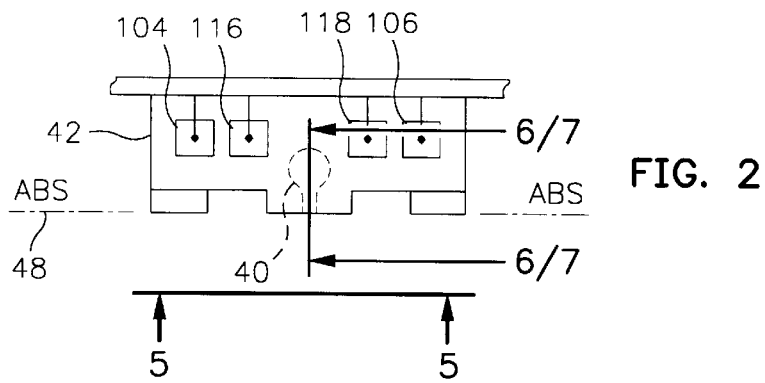
FIG. 2 is an end view of a slider with a magnetic head of the disk drive as seen in plane 2—2.
Figure 3:
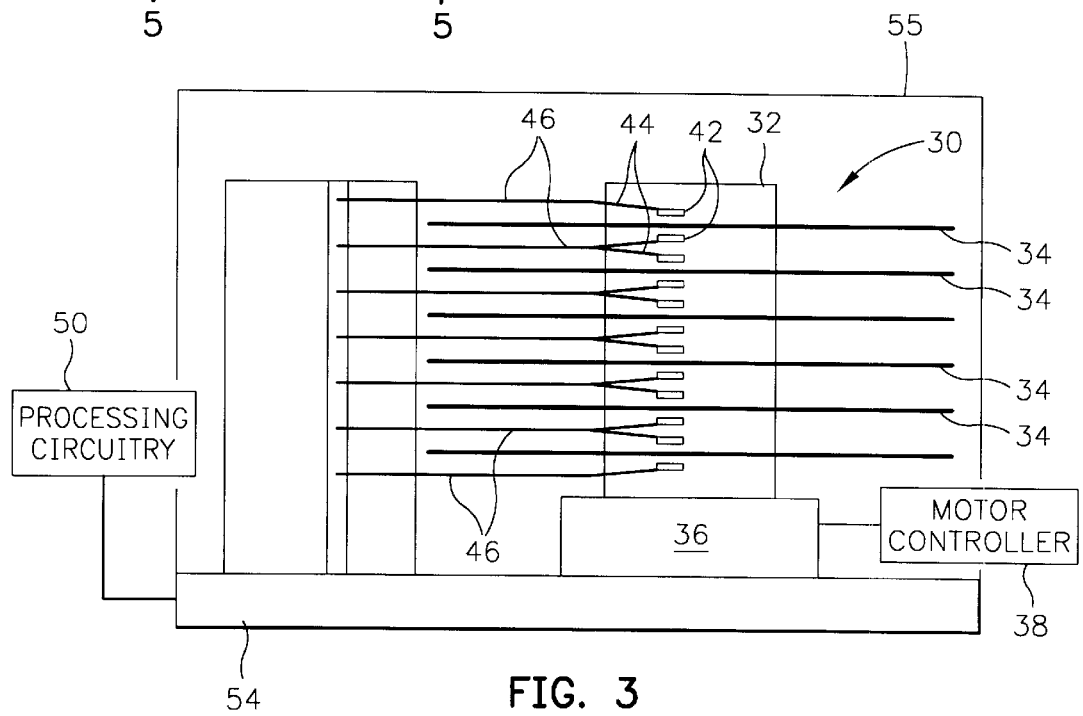
FIG. 3 is an elevation view of the magnetic disk drive wherein multiple disks and magnetic heads are employed.
Figure 4:
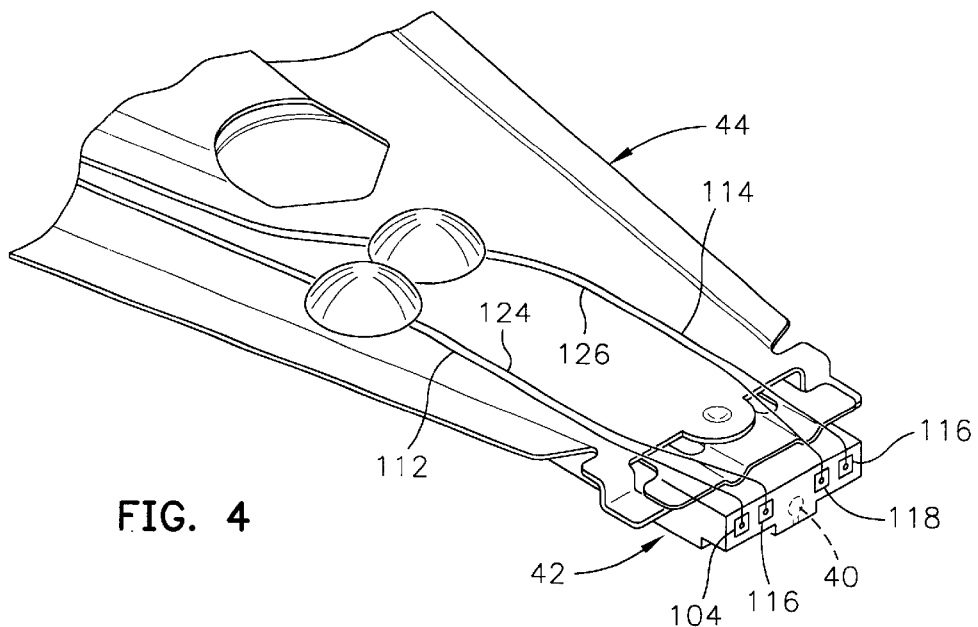
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
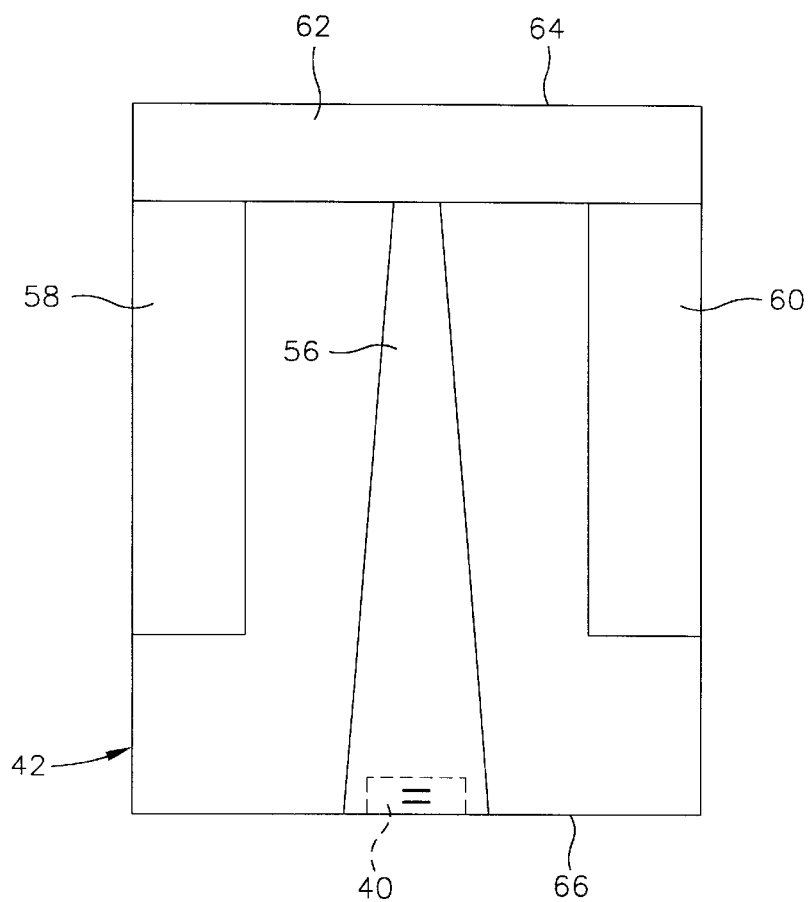
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing an AP pinned spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
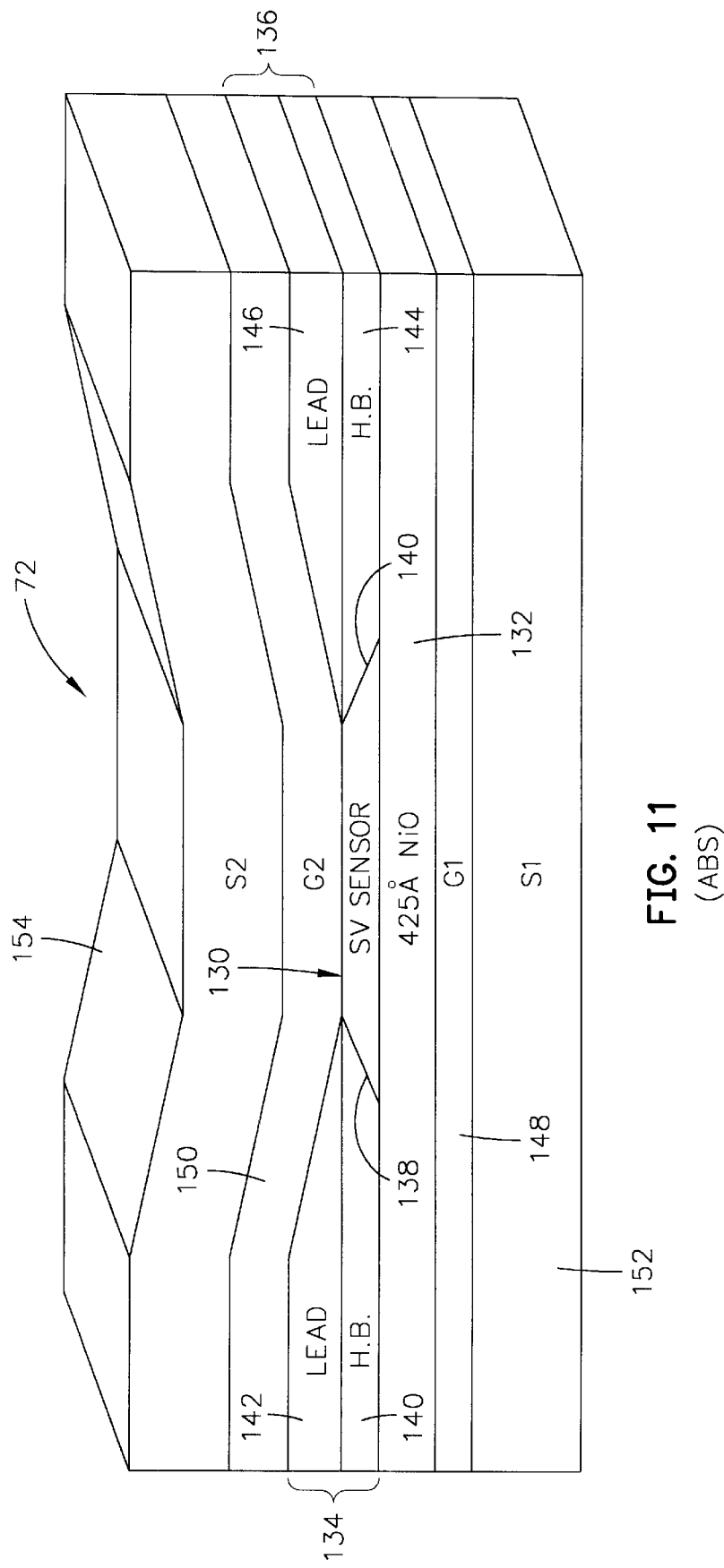
FIG. 11 is an isometric ABS illustration of a read head which employs an AP pinned spin valve (SV) sensor.

FIG. 11 is an isometric ABS illustration of the read head 72 shown in FIG. 6 or 8. The read head 72 includes a spin valve sensor 130 which is located on an antiferromagnetic. (AFM) pinning layer 132. The spin valve sensor 130 has an AP pinned structure, to be described hereinafter, that has its magnetic moments pinned by the magnetic spins of the pinning layer 132. The AFM pinning layer is preferably 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Exemplary Spin Valve Sensor

Figure 12:
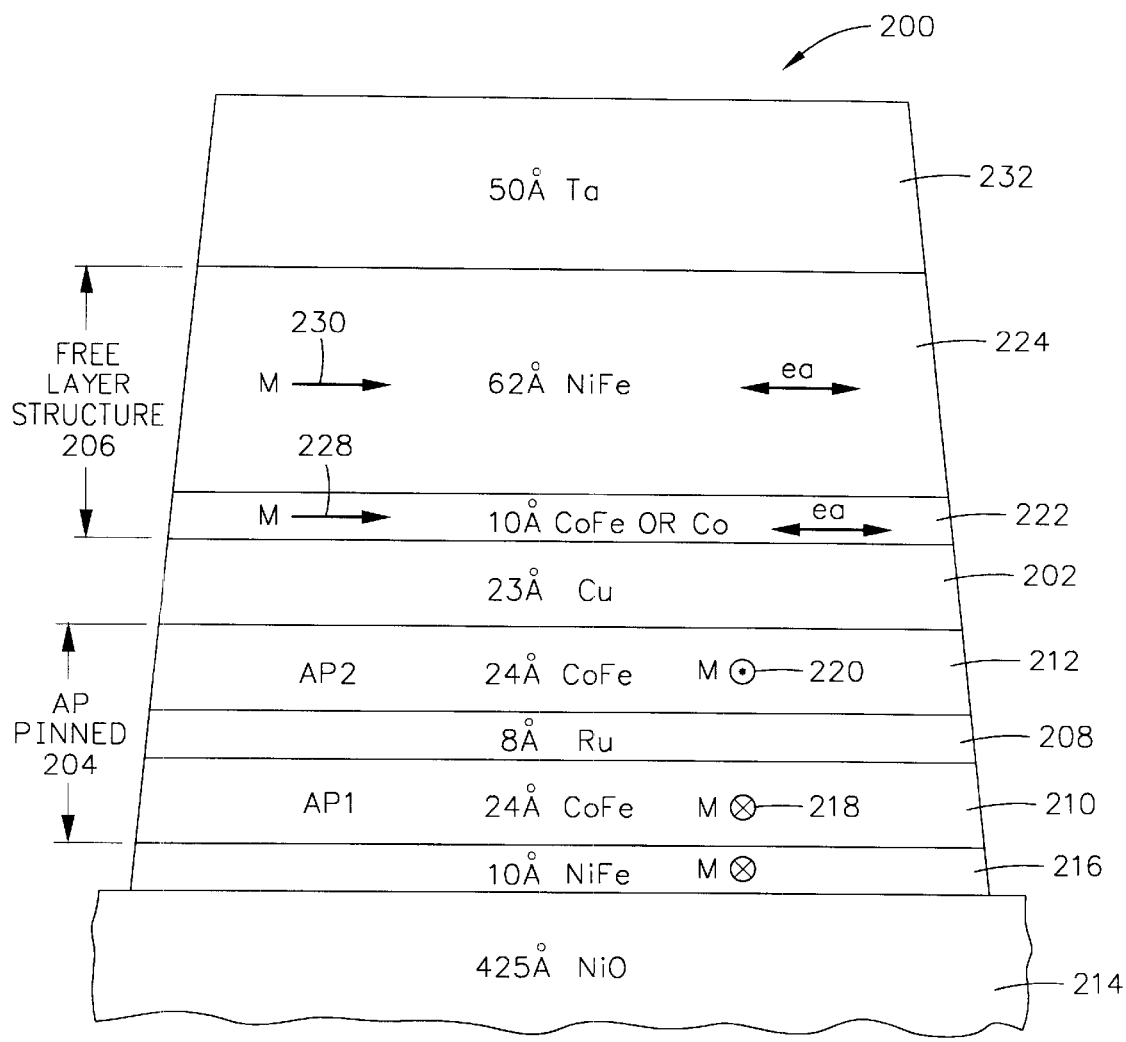
FIG. 12 is an ABS illustration of a spin valve sensor wherein a nanolayer increases the net uniaxial anisotropy ($H_K$) of a free layer structure.

FIG. 12 shows an exemplary spin valve sensor 200 which employs a nanolayer for increasing the magnetoresistive coefficient (dr/R) of the read head. The spin valve sensor 200 includes a nonmagnetic electrically conductive spacer layer 202 which is located between a pinned layer structure 204 and a free layer structure 206. The pinned layer structure 204 may be an antiparallel (AP) pinned layer which includes an antiparallel (AP) coupling layer 208 which is located between a first antiparallel (AP1) layer 210 and a second antiparallel (AP2) layer 212. The first AP pinned layer 210 may be exchange coupled to an antiferromagnetic layer 214 via an interlayer 216. With this arrangement the magnetic moment of the first AP pinned layer 210 is pinned perpendicular to the ABS, such as away from the ABS as shown at 218, and the second AP pinned layer 212 is pinned antiparallel thereto, as shown at 220. The first and second AP pinned layers 210 and 212 are preferably cobalt iron (CoFe). It has been found that an interlayer 216 of nickel iron (NiFe) improves the texture of the cobalt iron (CoFe) material of the first AP pinned layer 210 when it is constructed on a nickel oxide (NiO) AFM layer 214.

The free layer structure 206 is a bilayer structure comprising a nanolayer 222 between the spacer layer 202 and a nickel iron (NiFe) free layer 224. A nanolayer of cobalt (Co), or preferably cobalt iron (CoFe), between the spacer layer 202 and the nickel iron (NiFe) free layer 224 increases the magnetoresistive coefficient (dr/R) of the spin valve sensor. A drawback to the nanolayer 222, however, is that cobalt (Co) or cobalt iron (CoFe) has a high uniaxial anisotropy ($H_K$) which increases the net uniaxial anisotropy ($H_K$) of the free layer structure 206. This makes rotation of the magnetic moment of the free layer structure more stiff in its response to applied signals (H) from the rotating magnetic disk. This means that the read head is less sensitive to flux signals from the rotating magnetic disk. As stated hereinabove, the magnetic moment of the free layer structure is parallel to the ABS, as shown at 228 and 230 in FIG. 12, in a quiescent state, namely when the spin valve sensor is not being subjected to flux signals from the rotating magnetic disk. The magnetic moments of the layers 222 and 224 are in the same direction since they are exchange coupled together by interfacial engagement. The easy axes (ea) are likewise shown parallel to the ABS. Because of its high uniaxial anisotropy the nanolayer 222 is kept at a minimal thickness, such as 10 Å. A cap layer 232 of tantalum (Ta) may be formed on the free layer structure 206.

FIG. 13 is a schematic exploded isometric illustration of the free layer structure 206 of FIG. 12 with an applied field (H) being applied from a rotating magnetic disk. The uniaxial anisotropies ($H_K$) of each of the layers 222 and 224 combine to increase the overall net uniaxial anisotropy of the free layer structure 206. This reduces the sensitivity of the sensor.

The Invention

Assuming a field H is applied perpendicular to the ABS, anisotropy energy $E_K$ is a function of $\cos^2 \theta$ when the easy axis of the layer is perpendicular to the ABS and is a function of $\sin^2 \theta$ when the easy axis of the layer is parallel to the ABS. Anistropy energy $E_K$ can be expressed as $$Kt \sin^2 \theta$$

From the above I have derived a new relationship for an exemplary multilayer structure 200, as shown in FIG. 14, where the layers have their easy axes (ea) at various angles. For derivation purposes the exemplary structure includes a first layer 302 of $Co_{90}Fe_{10}$, with an easy axis (ea) parallel to the ABS, a uniaxial anisotropy constant $k_1$, a thickness $t_1$ and a magnetic moment $M_1$ at an angle $\theta$ to the ABS, a second layer 304 of $Ni_{80}Fe_{20}$ with an easy axis (ea) parallel to the ABS, a uniaxial anisotropy constant $k_2$, a thickness $t_2$ and a magnetic moment $M_2$ at an angle $\theta$ to the ABS and a third layer 306 of $Co_{90}Fe_{10}$ with an easy axis (ea) perpendicular to the ABS, a uniaxial anisotropy constant $k_3$, a thickness $t_3$ and a magnetic moment $M_3$ at an angle $\theta$ to the ABS. When a field H is applied perpendicular to the ABS the magnetic moments $M_1$, $M_2$ and $M_3$ rotate by the angle $\theta$ from the ABS. When fully rotated by an applied field H then $H=H_K'$. Since the layers 302, 304 and 306 interface one another they are magnetically exchange coupled, which means that the moments $M_1$, $M_2$ and $M_3$ assume the same direction. With the above information I made the following relationship:

$$E = (k_1 t_1 \sin^2 \theta + k_2 t_2 \sin^2 \theta + k_3 t_3 \cos^2 \theta) - M_1 t_1 \cdot H - M_2 t_2 \cdot H - M_3 t_3 \cdot H$$

where

E is energy of the layers;

the terms bracketed represent anisotropy energy $E_K$ energy per area; and the terms after the bracket represent applied field energy.

Converting the latter terms to scalar quantities it follows:

$$E = k_1 t_1 \sin^2 \theta + k_2 t_2 \sin^2 \theta + k_3 t_3 \cos^2 \theta - M_1 t_1 H \cos(90-\theta) - M_2 t_2 H \cos(90-\theta) - M_3 t_3 H \cos(90-\theta)$$

so that $$E = k_1 t_1 \sin^2 \theta + k_2 t_2 \sin^2 \theta + k_3 t_3 \cos^2 \theta - M_1 t_1 H \sin \theta - M_2 t_2 H \sin \theta - M_3 t_3 H \sin \theta$$

After taking a derivation to conserve energy, $$\frac{dE}{d\theta} = 2k_1t_1\sin\theta\cos\theta + 2k_2t_2\sin\theta\cos\theta -$$
$$2k_3t_3\cos\theta\sin\theta - M_1t_1H\cos\theta -$$
$$M_2t_2H\cos\theta - M_3t_3H\cos\theta$$
$$= 0$$

Therefore $$2\sin\theta(k_1t_1+k_2t_2-k_3t_3) = H(M_1t_1+M_2t_2+M_3t_3)$$

Letting $\theta=90°$ where the moment has been rotated perpendicular to the ABS so that $H=H_K$ then $$H_K = \frac{2(k_1t_1 + k_2t_2 - k_3t_3)}{M_1t_1 + M_2t_2 + M_3t_3}$$

If $k_1t_1+k_2t_2>k_3t_3$ then the magnet of the layers 302, 304 and 306 will be parallel to the ABS without an applied field H. If $k_3t_3>k_1t_1+k_2t_2$ then the magnetic moment will be perpendicular to the ABS. If there are only two layers with the easy axis of the first layer parallel to the ABS and the easy axis of the second layer perpendicular to the ABS then $$H_K = \frac{2(k_1t_1 - k_2t_2)}{M_1t_1 + M_2t_2}$$

The above relationship can be modified for any number of layers greater than one and the materials can be any ferromagnetic material in any combination.

FIG. 15 is an ABS illustration of an exemplary embodiment of the present invention. The sensor 400 in FIG. 15 is the same as the sensor 200 in FIG. 12 except for the free layer structure 402. The free layer structure 402 includes a nickel iron (NiFe) free layer 404 between first and second free layers 406 and 408. The first layer 406 is a nanolayer which is 10 Å of cobalt iron (CoFe) and the second layer is also 10 Å of cobalt iron (CoFe). The magnetic moments (M) of the layers 404, 406 and 408 are parallel to the ABS. The orientation is the same because all the layers are exchange coupled with respect to one another. The easy axis 410 of the first free layer 406 is parallel to the ABS, the easy axis 412 of the nickel iron (NiFe) free layer 404 is parallel to the ABS, and the easy axis 414 of the second free layer 408 is perpendicular to the ABS. An isometric schematic exploded illustration of the free layer structure 402 of FIG. 15 is shown in FIG. 16. Employing the derivation hereinabove, the net uniaxial anisotropy ($H_K$) of the free layer structure 402 shown in FIGS. 15 and 16 is 1.28 Oe. As a comparison, FIG. 17 shows an exploded schematic isometric illustration of the free layer structure wherein the easy axes (ea) of each of the layers 406, 404 and 408 are parallel to the ABS. Employing the derivation hereinabove, the net uniaxial anisotropy ($H_K$) of this free layer structure is 17.5 Oe. It can be seen that the net uniaxial anisotropy of the free layer structure shown in FIG. 17 is significantly higher than the net uniaxial anisotropy ($H_K$) of the free layer structure shown in FIG. 16. In essence, the uniaxial anisotropies ($H_K$) of the free layers 406 and 408 in FIG. 16 counterbalance one another leaving only the uniaxial anisotropy of the nickel iron (NiFe) free layer 404 as the net uniaxial anisotropy ($H_K$) of the free layer structure.

Figure 18:
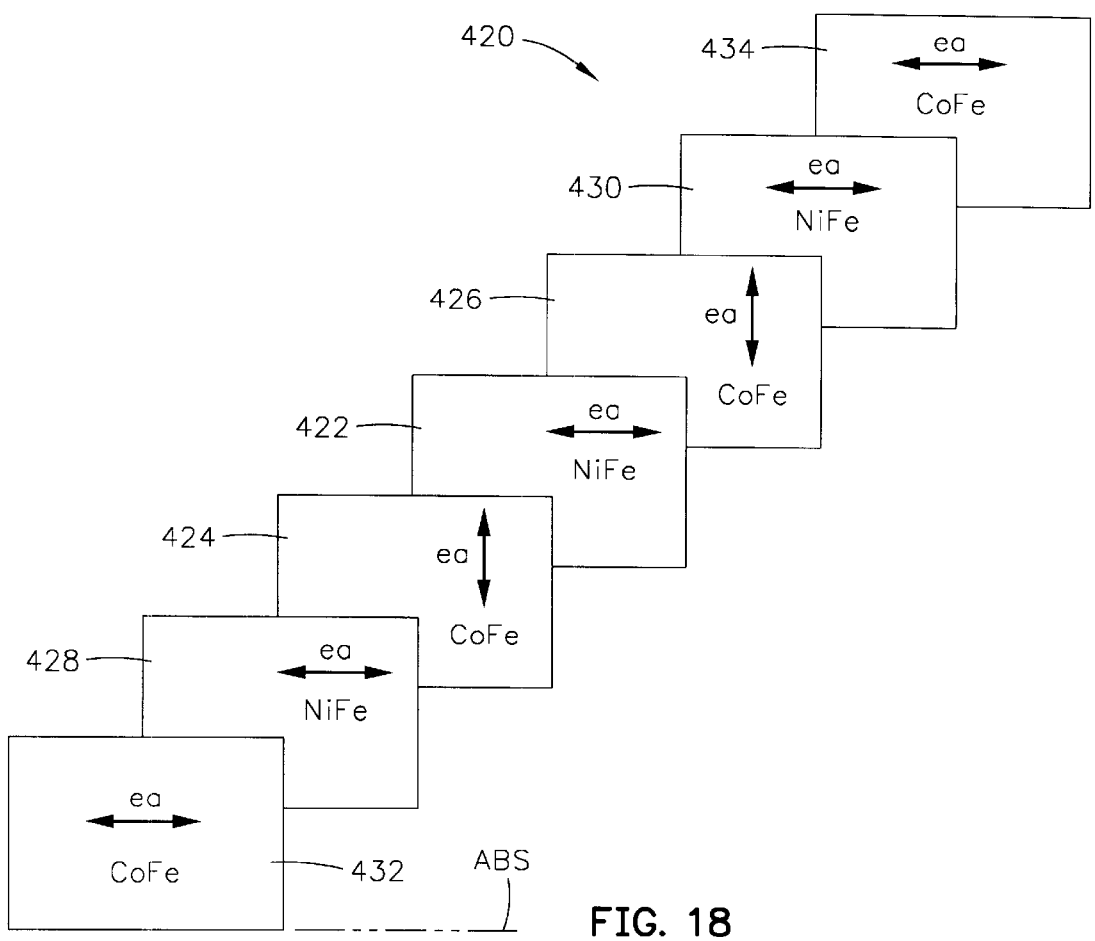
FIG. 18 is a schematic exploded isometric illustration of another embodiment of a free layer structure of the present invention.

It should be understood that there are many various embodiments can be envisioned employing the present invention. Another free layer structure embodiment 420 of the present invention is shown in FIG. 18 wherein a first layer 422 is located between second and third layers 424 and 426, the second and third layers 424 and 426 are located between fourth and fifth layers 428 and 430 and the fourth and fifth layers are located between the sixth and seventh layers 432 and 434. The layers 428, 422 and 430 may be nickel iron (NiFe) with their easy axes (ea) oriented parallel to the ABS. The layers 432, 424, 426 and 434 may be cobalt iron (CoFe) with the easy (ea) of the layers 432 and 434 oriented parallel to the ABS and the easy axes of the layers 424 and 426 oriented perpendicular to the ABS. Assuming that the thicknesses of the layers 432, 424, 426 and 434 are equal, their uniaxial anisotropies ($H_K$) will counterbalance one another leaving only the uniaxial anisotropies ($H_K$) of the nickel iron (NiFe) layers 428 and 422 as the net uniaxial anisotropy ($H_K$). If each of the layers were made 10 Å thick the overall thickness of the free layer structure would be 70 Å.

Figure 19:
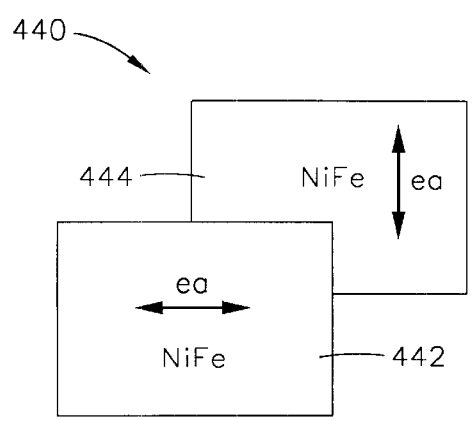
FIG. 19 is a schematic exploded isometric illustration of a further embodiment of a free layer structure of the present invention.

Another free layer structure 440, according to the present invention, is shown in FIG. 19. This free layer structure simply employs first and second layers of nickel iron (NiFe) wherein the easy axis (ea) of the first layer 442 is oriented parallel to the ABS and the easy axis (ea) of the second layer 442 is oriented perpendicular to the ABS. If the thickness of the layer 442 is greater than the thickness of the layer 444 the net uniaxial anisotropy will be parallel to the ABS. If the thicknesses of the layers 442 and 444 are equal the net uniaxial anisotropy ($H_K$) of the free layer structure 440 is zero and the orientation of the magnetic moment layer will be controlled by an extraneous magnetic force such as the hard bias layers 140 and 144 in FIG. 11.

Figure 20:
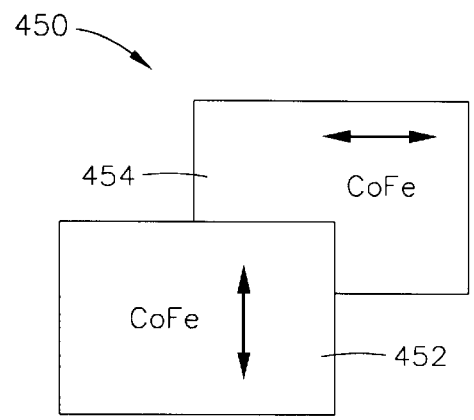
FIG. 20 is a schematic exploded isometric illustration of still a further free layer structure of the present invention.

Still another free layer structure 450 is illustrated in FIG. 20 which employs first and second layers 452 and 454. Each of the layers is cobalt iron (CoFe) with the easy (ea) of the first layer 452 oriented perpendicular to the ABS and the easy axis (ea) of the second layer 454 oriented parallel to the ABS. If the thicknesses of the layers 452 and 454 are equal, once again the net uniaxial anisotropy ($H_K$) would be equal to zero. In a preferred embodiment the second layer 454 is made slightly thicker than the layer 452 so that the magnetic moment of the free layer structure 450 would be oriented parallel to the ABS in a quiescent state.

Figure 21:
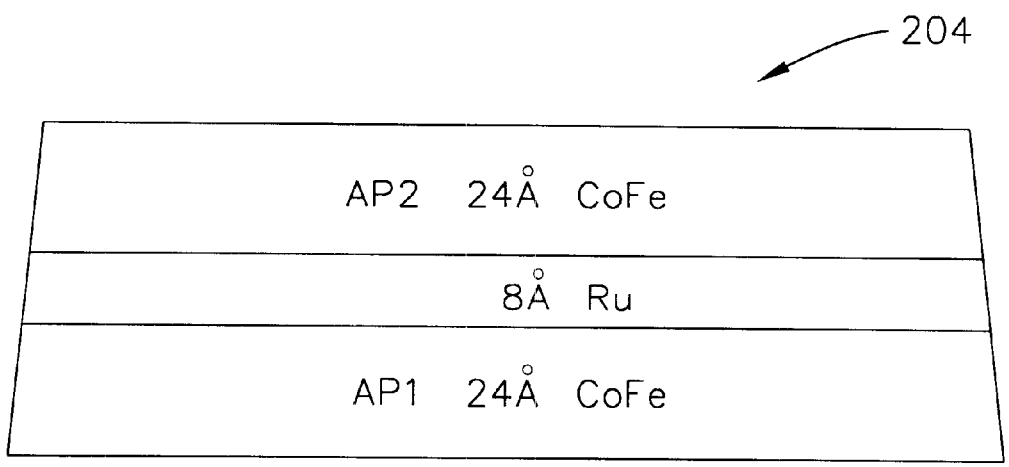
FIG. 21 is an ABS illustration of an antiparallel (AP) pinned layer.
Figure 22:
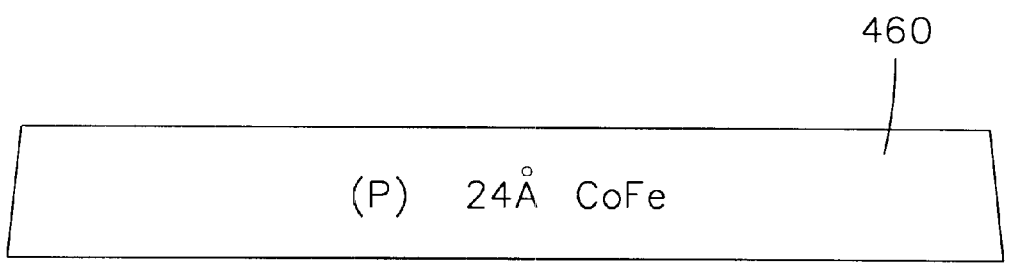
FIG. 22 is an ABS illustration of a single layer pinned layer.

FIG. 21 is the antiparallel (AP) structure 204 of FIG. 15. FIG. 22 is a single ferromagnetic pinned layer (P) 460 which can be substituted for the AP pinned layer 204 shown in FIG. 21. When the single pinned layer 460 is employed, the spin valve sensor is referred to as a simple spin valve. The spin valve sensor 400 in FIG. 15 is known in the art as a bottom spin valve since the AFM layer is located at the bottom of the sensor and is constructed before the other layers. In a top spin valve the layers are essentially the same as that shown in FIG. 15 except inverted with the AFM layer being located at the top. It should be understood that the present invention also applies to top spin valves as well as bottom spin valves.

Figure 23:
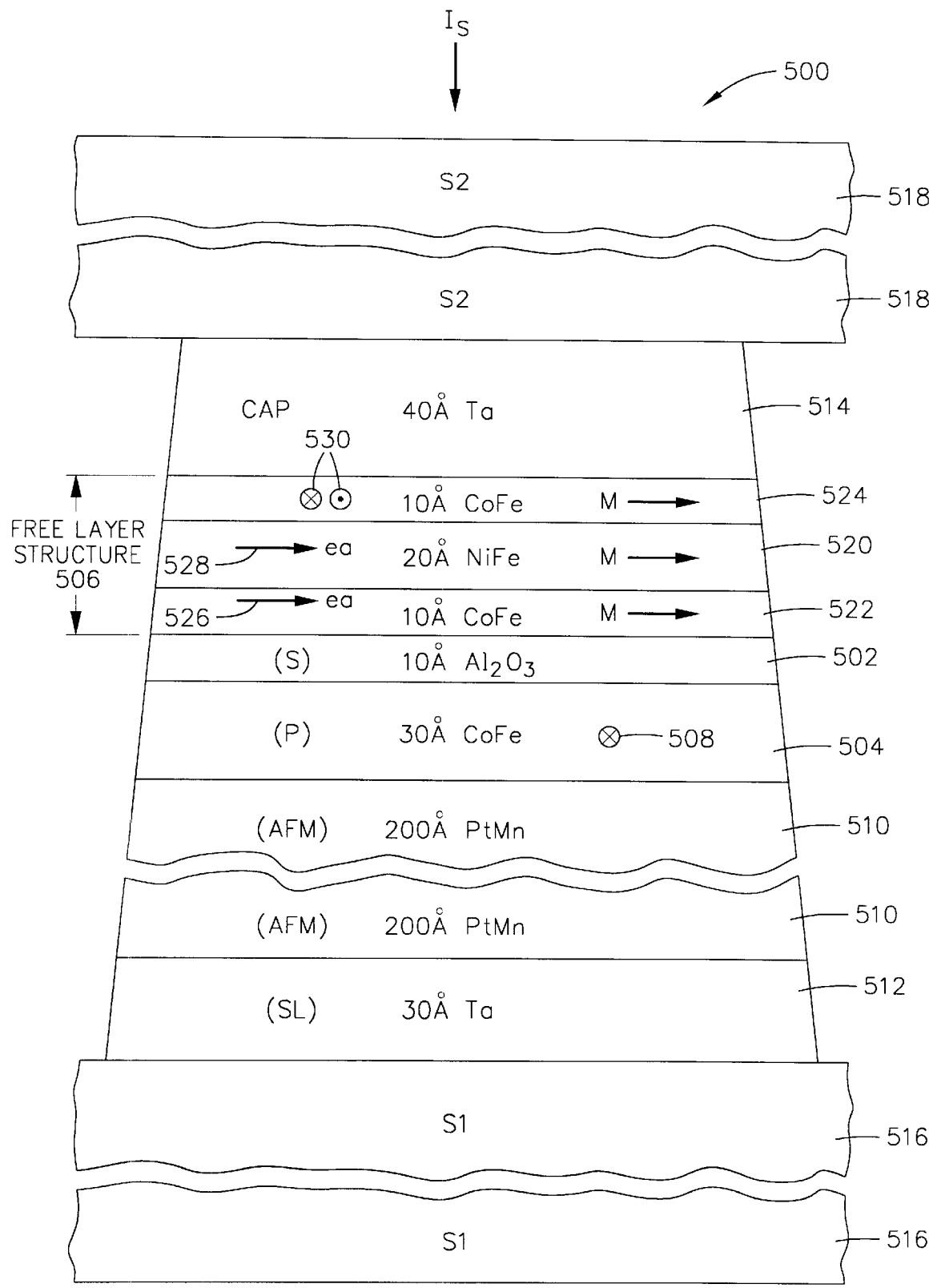
FIG. 23 is an ABS illustration of a tunnel junction sensor employing the present invention.

Another type sensor in which the present invention may be employed is a tunnel junction sensor 500, as shown in FIG. 23. The tunnel junction sensor includes a spacer layer (S) 502 which is located between a pinned layer (P) 504 and a free layer structure 506. The pinned layer 504 has its magnetic moment 508 pinned perpendicular to the ABS, such as into the paper, by an antiferromagnetic(AFM) pinning layer 510. The pinning layer 510 and the free layer structure 506 may be located between a seed layer 512 and a capping layer 514 and the layers 512 and 514 may be located between first and second shield layers (S1) and (S2) 516 and 518. The tunnel junction sensor 500 differs from the spin valve sensor 400, shown in FIG. 15, in that the sense current $I_S$ in the tunnel junction 500 is directed perpendicular to the planes of the layers of the sensor whereas the sense current $I_S$ of the spin valve sensor 400 in FIG. 15 is directed parallel to the planes of the layers of the sensor.

The free layer structure 506 of the tunnel junction sensor in FIG. 23 may be the same as the free layer structure 402 shown for the spin valve sensor in FIG. 15. Accordingly, a nickel iron (NiFe) layer 520 may be located between first and second layers 522 and 524 wherein the first layer 522 is a nanolayer of 10 Å of cobalt iron (CoFe) and the second layer 524 is also 10 Å of cobalt iron (CoFe). The easy axes (ea) 526 and 528 of the layers 522 and 520 are oriented parallel to the ABS and the easy axis (ea) 530 of the layer 534 is oriented perpendicular to the ABS. Uniaxial anisotropies ($H_K$) of the layers 522 and 524 will counterbalance one another leaving a net uniaxial anisotropy which is the uniaxial anisotropy ($H_K$) of the layer 520. Again, the magnetic moments (M) are oriented in the same direction since the layers 522, 520 and 524 are coupled together by exchange coupling. It should be understood that the other embodiments described hereinabove may also be substituted for the free layer structure 506 shown in FIG. 23.

Figure 24A:
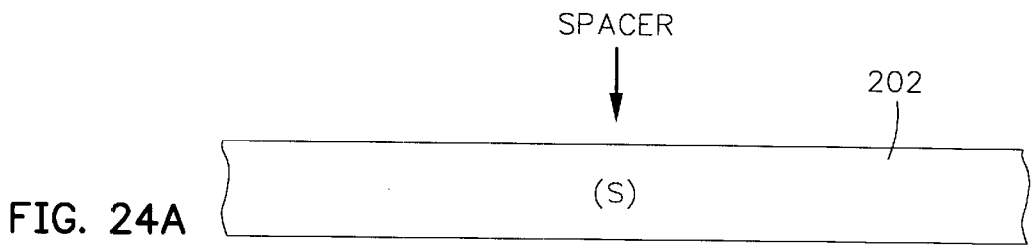
FIGS. 24A–24D are steps involved in formation of the multilayered free layer structure shown in FIGS. 15 and 23.
Figure 24B:
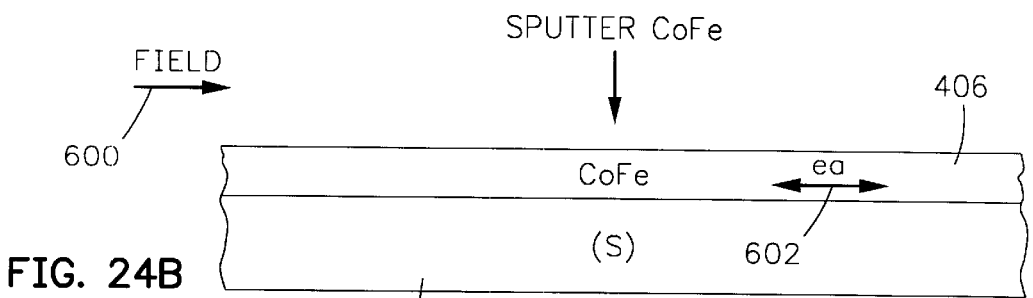
Figure 24C:
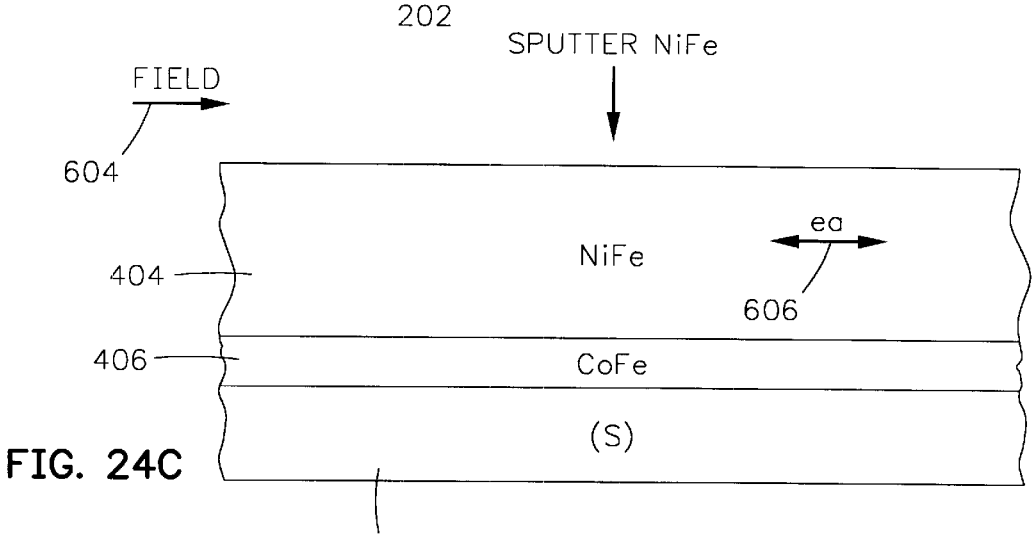
Figure 24D:
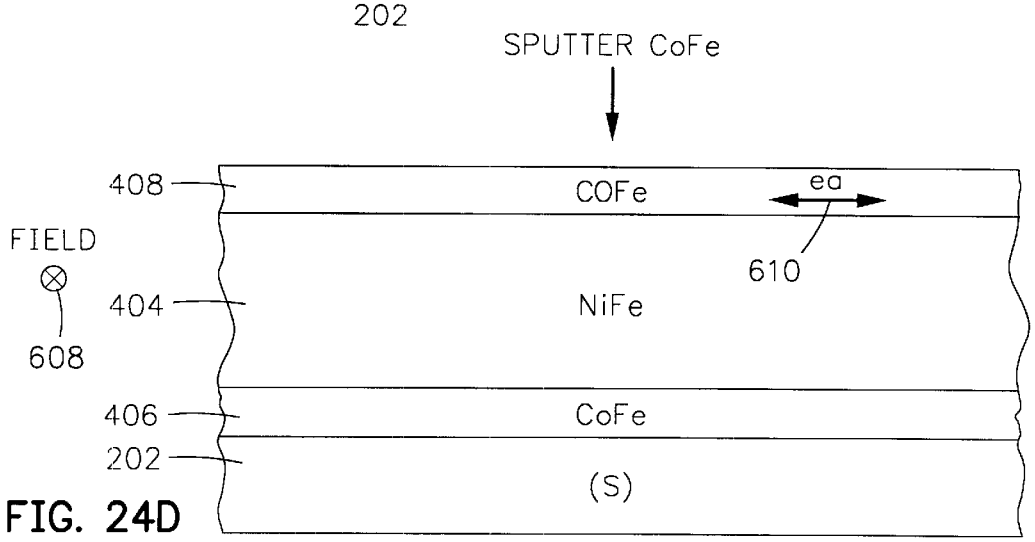

FIGS. 24A–24D illustrate various steps in the construction of the free layer structure shown in FIG. 15 or 23. In FIG. 24A copper (Cu) is sputter deposited on a wafer substrate to form the spacer layer (S) 202. In FIG. 24B cobalt iron (CoFe) is sputter deposited in the presence of a field 600 which is directed parallel to the ABS to form the nanolayer 406 with an easy axis (ea) 602 which is oriented parallel to the ABS. In FIG. 24C nickel iron (NiFe) is sputter deposited in the presence of a field 604 which is directed parallel to the ABS to form the nickel iron (NiFe) layer 404 with an easy axis (ea) 606 that is oriented parallel to the ABS. In FIG. 24D cobalt iron (CoFe) is sputter deposited in the presence of a field 608 which is oriented perpendicular to the ABS, such as away from the paper, to form the layer 408 with an easy axis (ea) 610 which is oriented parallel to the ABS.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head having a top and a bottom wherein the bottom is formed before the top comprising:
   a sensor having a top and a bottom wherein the bottom is formed before the top and including:
      an antiferromagnetic pinning layer defining the bottom of the sensor;
      a ferromagnetic pinned layered structure exchange coupled to the pinning layer and having a magnetic moment pinned by the pinning layer;
      a multilayered ferromagnetic free layer structure having a magnetic moment that is free to respond to applied fields;
      a nonmagnetic electrically conductive spacer layer located between the pinned layer structure and the free layer structure;
      the free layer structure including at least first, second and third free layers with the third free layer located between the first and second free layers;
      each of the first and second free layers having a uniaxial anisotropy that is greater than a uniaxial anisotropy of the third free layer;
      a cap layer interfacing the free layer structure and defining the top of the sensor;
      the first free layer having a first easy axis that is oriented in a first direction and the second free layer having a second easy axis that is oriented in a second direction; and
      the first and second directions being at an angle of 90° with respect to one another.

2. A magnetic read head as claimed in claim 1 including:
   first and second hard bias and lead layers connected to first and second side edges of the sensor;
   nonmagnetic electrically insulative first and second read gap layers;
   the sensor and the first and second hard bias and lead layers being located between the first and second read gap layers;
   ferromagnetic first and second shield layers wherein the first shield layer defines the bottom of the read head and the second shield layer defines the top of the read head; and
   the first and second read gap layers being located between the first and second shield layers.

3. A magnetic read head as claimed in claim 1 wherein the uniaxial anisotropies of the first and second free layers are equal.

4. A magnetic read head as claimed in claim 3 wherein the first and second free layers have equal thicknesses and are cobalt (Co) or cobalt iron (CoFe) and the third free layer is nickel iron (NiFe).

5. A magnetic read head as claimed in claim 4 wherein the first and second free layers are cobalt iron (CoFe).

6. A magnetic read head as claimed in claim 5 including:
   first and second hard bias and lead layers connected to first and second side edges of the sensor;
   nonmagnetic electrically insulative first and second read gap layers;
   the sensor and the first and second hard bias and lead layers being located between the first and second read gap layers;
   ferromagnetic first and second shield layers wherein the first shield layer defines the bottom of the read head and the second shield layer defines the top of the read head; and
   the first and second read gap layers being located between the first and second shield layers.

7. A magnetic read head as claimed in claim 6 wherein the pinned layer structure includes a single ferromagnetic layer.

8. A magnetic read head as claimed in claim 6 wherein the pinned layer structure includes:
   ferromagnetic first and second antiparallel layers; and
   an antiparallel coupling layer located between the first and second antiparallel layers.

9. A magnetic head assembly having a read head and a write head comprising:
   the write head including:
      first and second pole piece layers;
      each of the first and second pole piece layers having a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gaps portions; and the read head having a top and a bottom wherein the bottom is formed before the top and including:
nonmagnetic electrically insulative first and second read gap layers;
a sensor having a top and a bottom wherein the bottom is formed before the top;
first and second hard bias and lead layers connected to first and second side edges of the sensor;
the sensor and the first and second lead layers being located between the first and second read gap layers;
a first shield layer defining a bottom of the read head;
the first and second read gap layers being located between the first shield layer and the first pole piece layer; and the sensor including:
an antiferromagnetic pinning layer defining a bottom of the sensor;
a ferromagnetic pinned layer structure exchange coupled to the pinning layer and having a magnetic moment pinned by the pinning layer;
a multilayered ferromagnetic free layer structure having a magnetic moment that is free to respond to applied fields;
a cap layer interfacing the free layer structure and defining a top of the sensor;
a nonmagnetic electrically conductive spacer layer located between the pinned layer structure and the free layer structure;
the free layer structure including at least first, second and third free layers with the third free layer located between the first and second free layers;
each of the first and second free layers having a uniaxial anisotropy that is greater than a uniaxial anisotropy of the third free layer;
the first free layer having a first easy axis that is oriented in a first direction and the second free layer having a second easy axis that is oriented in a second direction; and
the first and second directions being at an angle of 90° with respect to one another.

10. A magnetic head assembly as claimed in claim 9 wherein the pinned layer structure includes:
ferromagnetic first and second antiparallel layers; and
an antiparallel coupling layer located between the first and second antiparallel layers.

11. A magnetic head assembly as claimed in claim 9 wherein the uniaxial anisotropies of the first and second free layers are equal.

12. A magnetic head assembly as claimed in claim 11 wherein the first and second free layers have equal thicknesses and are cobalt (Co) or cobalt iron (CoFe) and the third free layer is nickel iron (NiFe).

13. A magnetic head assembly as claimed in claim 12 wherein the first and second free layers are cobalt iron (CoFe).

14. A magnetic disk drive having at least one slider that has an air bearing surface (ABS), the slider supporting at least one magnetic head assembly that includes a read head and a write head, the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head having a top and a bottom wherein the bottom is formed before the top and including:
nonmagnetic electrically insulative first and second read gap layers;
a sensor having a top and a bottom wherein the bottom is formed before the top;
first and second hard bias and lead layers connected to first and second side edges of the sensor;
the sensor and the first and second hard bias and lead layers being located between the first and second read gap layers;
a first shield layer defining a bottom of the read head;
the first and second read gap layers being located between the first shield layer and the first pole piece layer; and the sensor including:
an antiferromagnetic pinning layer defining a bottom of the sensor;
a ferromagnetic pinned layered structure exchange coupled to the pinning layer and having a magnetic moment pinned by the pinning layer;
a multilayered ferromagnetic free layer structure having a magnetic moment that is free to respond to applied fields;
a cap layer interfacing the free layer structure and defining a top of the sensor;
a nonmagnetic electrically conductive spacer layer located between the pinned layer structure and the free layer structure;
the free layer structure including at least first, second and third free layers with the third free layer located between the first and second free layers;
each of the first and second free layers having a uniaxial anisotropy that is greater than a uniaxial anisotropy of the third free layer;
the first free layer having a first easy axis that is oriented in a first direction and the second free layer having a second easy axis that is oriented in a second direction; and
the first and second directions being at an angle of 90° with respect to one another and a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
means for rotating the magnetic disk;
positioning means connected to the support for moving the magnetic head assembly to multiple positions with respect to said magnetic disk; and
processing means connected to the magnetic head assembly, to the means for rotating the magnetic disk and to the positioning means for exchanging signals with the magnetic head assembly, for controlling movement of the magnetic disk and for controlling the position of the magnetic head assembly.

15. A magnetic disk drive as claimed in claim 14 wherein the uniaxial anisotropies of the first and second free layers are equal.

16. A magnetic disk drive as claimed in claim 15 wherein the first and second free layers have equal thicknesses and are cobalt (Co) or cobalt iron (CoFe) and the third free layer is nickel iron (NiFe).

17. A magnetic disk drive as claimed in claim 16 wherein the first and second free layers are cobalt iron (CoFe).

18. A method of making a magnetic read head comprising:
making a sensor as follows:
    forming an antiferromagnetic pinning layer;
    after forming the pinning layer forming a ferromagnetic pinned layer structure exchange coupled to the pinning layer and having a magnetic moment pinned by the pinning layer;
    after forming the pinned layer structure forming a nonmagnetic electrically conductive spacer layer on the pinned layer structure;
    after forming the spacer layer forming a multilayered ferromagnetic free layer structure on the spacer layer that has a magnetic moment that is free to respond to applied fields;
    forming the free layer structure with first and second free layers with the first free layer having a first easy axis that is oriented in a first direction and the second free layer having a second easy axis that is oriented in a second direction and the first and second directions being at an angle of 90° with respect to one another; and
    forming a third free layer on the first free layer and forming the second free layer on the third free layer with each of the first and second free layers having a uniaxial anisotropy that is greater than a uniaxial anisotropy of the third free layer.

19. A method as claimed in claim 18 including:
forming a ferromagnetic first shield layer;
forming a nonmagnetic electrically insulative first read gap layer on the first shield layer;
connecting first and second hard bias and lead layers to first and second side edges of the sensor;
forming a nonmagnetic electrically insulative second read gap layer on the sensor and the first and second hard bias and lead layers; and
forming a ferromagnetic second shield layer on the second read gap layer.

20. A method as claimed in claim 18 wherein the first and second free layers are formed with uniaxial anisotropies that are equal.

21. A method as claimed in claim 20 wherein the first and second free layers are formed with equal thicknesses and are formed of cobalt (Co) or cobalt iron (CoFe) and the third free layer is formed of nickel iron (NiFe).

22. A method as claimed in claim 21 wherein the first and second free layers are formed of cobalt iron (CoFe).

23. A method as claimed in claim 22 including:
forming a ferromagnetic first shield layer;
forming a nonmagnetic electrically insulative first read gap layer on the first shield layer;
connecting first and second hard bias and lead layers to first and second side edges of the sensor;
forming a nonmagnetic electrically insulative second read gap layer on the sensor and the first and second hard bias and lead layers; and
forming a ferromagnetic second shield layer on the second read gap layer.

24. A method of making a magnetic head assembly having a read head and a write head comprising:
forming a read head as follows:
    forming a ferromagnetic first shield layer,
    forming a nonmagnetic electrically insulative first read gap layer on the first shield layer;
    forming a sensor on the first read gap layer as follows:
        forming an antiferromagnetic pinning layer;
        after forming the pinning layer forming a ferromagnetic pinned layer structure exchanged coupled to the pinning layer hand having a magnetic moment pinned by the pinning layer;
        after forming the pinned layer structure forming a nonmagnetic electrically conductive spacer layer on the pinned layer structure;
        after forming the spacer layer forming a multilayered ferromagnetic free layer structure on the spacer layer that has a magnetic moment that is free to respond to applied fields;
        forming the free layer structure with first and second free layers with the first free layer having a first easy axis that is oriented in a first direction and the second free layer having a second easy axis that is oriented in the second direction and the first and second directions being at an angle of 90° with respect to one another;
        forming a third free layer on the first free layer and forming the second free layer on the third free layer with each of the first and second free layers having a uniaxial anisotropy that is greater than a uniaxial anisotropy of the third free layer;
    connecting first and second hard bias and lead layers to first and second side edges of the sensor;
    forming a nonmagnetic electrically insulative second read gap layer on the sensor and the first and second hard bias and lead layers; and
    forming a ferromagnetic second shield layer on the second read gap layer; and
forming a write head as follows:
    forming a nonmagnetic electrically insulative separation layer on the second shield layer;
    forming a ferromagnetic first pole piece layer on the separation layer that has a yoke region located between a pole tip region and a back gap region;
    forming an insulation stack with at least one coil layer embedded therein on the first pole piece layer in the yoke region;
    forming a nonmagnetic electrically insulative write gap layer on the first pole piece layer in the pole tip region; and
    forming a ferromagnetic second pole piece layer on the write gap layer, the insulation stack and connected to the first pole piece layer in the back gap region.

25. A method as claimed in claim 24 wherein the first and second free layers are formed with uniaxial anisotropies that are equal.

26. A method as claimed in claim 25 wherein the first and second free layers are formed with equal thicknesses and are formed of cobalt (Co) or cobalt iron (CoFe) and the third free layer is formed of nickel iron (NiFe).

27. A method as claimed in claim 26 wherein the first and second free layers are formed of cobalt iron (CoFe).

28. A magnetic read head comprising:
a sensor including:
    an antiferromagnetic pinning layer;
    a ferromagnetic pinned layered structure exchange coupled to the pinning layer and having a magnetic moment pinned by the pinning layer;
    a multilayered ferromagnetic free layer structure having a magnetic moment that is free to respond to applied fields;
    a nonmagnetic electrically conductive spacer layer located between the pinned layer structure and the free layer structure;

the free layer structure including first, second an third free layers with the third free layer located between the first and second free layers and with each of the first and second free layers having a uniaxial anisotropy that is greater than a uniaxial anisotropy of the third three layer;

the first free layer having a first easy axis that is oriented in a first direction and the second free layer having a second easy axis that is oriented in a second direction; and the first and second directions being at an angle with respect to one another.

29. A magnetic read head as claimed in claim 28 wherein the uniaxial anisotropies of the first and second free layers are equal.

30. A magnetic read head as claimed in claim 29 wherein the first and second free layers have equal thicknesses and are cobalt (Co) or cobalt iron (CoFe) and the third free layer is nickel iron (NiFe).

31. A magnetic read head as claimed in claim 30 including:

first and second hard bias and lead layers connected to first and second side edges of the sensor;

nonmagnetic electrically insulative first and second read gap layers;

the sensor and the first and second hard bias and lead layers being located between the first and second read gap layers;

ferromagnetic first and second shield layers;

the first and second read gap layers being located between the first and second shield layers.

32. A magnetic disk drive having at least one slider that has an air bearing surface (ABS), the slider supporting at least one magnetic head assembly that includes a read head and a write head, the disk drive comprising:

the write head including:

first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

nonmagnetic electrically insulative first and second read gap layers;

a sensor;

first and second hard bias and lead layers connected to first and second side edges of the sensor;

the sensor and the first and second hard bias and lead layers being located between the first and second read gap layers;

a first shield layer;

the first and second read gap layers being located between the first shield layer and the first pole piece layer; and the sensor including:

an antiferromagnetic pinning layer;

a ferromagnetic pinned layered structure exchange coupled to the pinning layer and having a magnetic moment pinned by the pinning layer;

a multilayered ferromagnetic free layer structure having a magnetic moment that is free to respond to applied fields;

a nonmagnetic electrically conductive spacer layer located between the pinned layer structure and the free layer structure;

the free layer structure including first, second and third free layers with the third free layer located between the first and second free layers and with each of the first and second free layers having a uniaxial anisotropy that is greater than a uniaxial anisotropy of the third free layer;

the first free layer having a first easy axis that is oriented in a first direction and the second free layer having a second easy axis that is oriented in a second direction; and the first and second directions being at an angle with respect to one another and a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

means for rotating the magnetic disk;

positioning means connected to the support for moving the magnetic head assembly to multiple positions with respect to said magnetic disk; and processing means connected to the magnetic head assembly, to the means for rotating the magnetic disk and to the positioning means for exchanging signals with the magnetic head assembly, for controlling movement of the magnetic disk and for controlling the position of the magnetic head assembly.

33. A magnetic disk drive as claimed in claim 32 wherein said angle is 90°.

34. A magnetic disk drive as claimed in claim 33 wherein the uniaxial anisotropies of the first and second free layers are equal.

35. A magnetic disk drive as claimed in claim 34 wherein the first and second free layers have equal thicknesses and are cobalt (Co) or cobalt iron (CoFe) and the third free layer is nickel iron (NiFe).

36. A method of making a magnetic read head comprising:

making a sensor as follows:

forming an antiferromagnetic pinning layer;

forming a ferromagnetic pinned layered structure exchange coupled to the pinning layer and having a magnetic moment pinned by the pinning layer;

forming a nonmagnetic electrically conductive spacer layer on the pinned layer;

forming a multilayered ferromagnetic free layer structure on the spacer layer that has a magnetic moment that is free to respond to applied fields;

forming the free layer structure with first, second and third free layers with the third free layer located between the first and second free layers and with each of the first and second free layers having a uniaxial anisotropy that is greater than a uniaxial anisotropy of the third free layer; and the first free layer having a first easy axis that is oriented in a first direction and the second free layer having a second easy axis that is oriented in a second direction and the first and second directions being at an angle with respect to one another.

37. A method as claimed in claim 36 including:

forming a ferromagnetic first shield layer;

forming a nonmagnetic electrically insulative first read gap layer on the first shield layer;

connecting first and second hard bias and lead layers to first and second side edges of the sensor;

forming a nonmagnetic electrically insulative second read gap layer on the sensor and the first and second hard bias and lead layers; and forming a ferromagnetic second shield layer on the second read gap layer.

38. A method as claimed in claim 37 wherein the first and second free layers are formed with said angle equal to 90°.

39. A method as claimed in claim 38 wherein the first and second free layers are formed with uniaxial anisotropies that are equal.

40. A method as claimed in claim 39 wherein the first and second free layers are formed with equal thicknesses and are formed of cobalt (Co) or cobalt iron (CoFe) and the third free layer is formed of nickel iron (NiFe).

41. A method of making a magnetic head assembly having a read head and a write head comprising:

forming a read head as follows:
  forming a ferromagnetic first shield layer;
  forming a nonmagnetic electrically insulative first read gap layer on the first shield layer;
  forming a sensor on the first read gap layer as follows:
    forming an antiferromagnetic pinning layer;
    forming a ferromagnetic pinned layered structure exchange coupled to the
  pinning layer and having a magnetic moment pinned by the pinning layer;
    forming a nonmagnetic electrically conductive spacer layer on the pinned layer;
    forming a multilayered ferromagnetic free layer structure on the spacer layer that has a magnetic moment that is free to respond to applied fields;
    forming the free layer structure with first, second and third free layers with the third free layer located between the first and second free layers and with each of the first and second free layers having a uniaxial anisotropy that is greater than a uniaxial anisotropy of the third free layer;
    the first free layer having a first easy axis that is oriented in a first direction and the second free layer having a second easy axis that is oriented in a second direction and the first and second directions being at an angle with respect to one another;
  connecting first and second hard bias and lead layers to first and second side edges of the sensor;
  forming a nonmagnetic electrically insulative second read gap layer on the sensor and the first and second hard bias and lead layers; and
  forming a ferromagnetic second shield layer on the second read gap layer; and forming a write head as follows:
  forming a nonmagnetic electrically insulative separation layer on the second shield layer;
  forming a ferromagnetic first pole piece layer on the separation layer that has a yoke region located between a pole tip region and a back gap region;
  forming an insulation stack with at least one coil layer embedded therein on the first pole piece layer in the yoke region;
  forming a nonmagnetic electrically insulative write gap layer on the first pole piece layer in the pole tip region; and
  forming a ferromagnetic second pole piece layer on the write gap layer, the insulation stack and connected to the first pole piece layer in the back gap region.

42. A method as claimed in claim 41 wherein the first and second free layers are formed with said angle equal to 90°.

43. A method as claimed in claim 42 wherein the first and second free layers are formed with uniaxial anisotropies that are equal.

44. A method as claimed in claim 43 wherein the first and second free layers are formed with equal thicknesses and are formed of cobalt (Co) or cobalt iron (CoFe) and the third free layer is formed of nickel iron (NiFe).

* * * * *